(12) United States Patent
Hallivuori et al.

(10) Patent No.: US 10,218,612 B2
(45) Date of Patent: Feb. 26, 2019

(54) METHOD AND A DEVICE FOR DEFINING IMPLEMENTATION OF A LOOK-UP TABLE FOR A NETWORK ELEMENT OF A SOFTWARE-DEFINED NETWORK

(71) Applicant: TELLABS OY, Espoo (FI)

(72) Inventors: Ville Hallivuori, Espoo (FI); Juhamatti Kuusisaari, Helsinki (FI)

(73) Assignee: CORIANT OY, Espoo (FI)

( * ) Notice: Subject to any disclaimer, the term of this patent is extended or adjusted under 35 U.S.C. 154(b) by 223 days.

(21) Appl. No.: 14/147,994

(22) Filed: Jan. 6, 2014

(65) Prior Publication Data

US 2014/0192813 A1      Jul. 10, 2014

(30) Foreign Application Priority Data

Jan. 4, 2013   (FI) ...................................... 20135015

(51) Int. Cl.
*H04L 12/741* (2013.01)
*H04L 12/24* (2006.01)

(52) U.S. Cl.
CPC .......... *H04L 45/54* (2013.01); *H04L 41/0803* (2013.01)

(58) Field of Classification Search
None
See application file for complete search history.

(56) References Cited

U.S. PATENT DOCUMENTS

| 6,788,700 | B1 | 9/2004 | Nakil |
| 7,167,471 | B2 | 1/2007 | Calvignac et al. |
| 7,215,637 | B1 * | 5/2007 | Ferguson ................ H04L 45/00 370/230.1 |
| 2004/0213274 | A1 | 10/2004 | Fan et al. |

(Continued)

FOREIGN PATENT DOCUMENTS

| CN | 102301663 A | 12/2011 |
| EP | 0 612 154 B1 | 7/1998 |

(Continued)

OTHER PUBLICATIONS

European Search Report, dated Feb. 20, 2014, from corresponding EP application.

(Continued)

*Primary Examiner* — Christopher M Crutchfield
*Assistant Examiner* — Thinh D Tran
(74) *Attorney, Agent, or Firm* — Young & Thompson

(57) ABSTRACT

A method and a device for defining implementation of a look-up table for a network element of a software-defined network "SDN" is presented. The network element includes hardware for implementing the look-up table in two or more mutually alternative ways. The method includes selecting (301) an optimal, or at least a suitable, one of the mutually alternative ways to implement the look-up table on the basis of a) the hardware available for implementing the look-up table, b) information about one or more look-up keys, and c) at least one of the following: the maximum number of entries of the look-up table, an average time between suc- (Continued)

cessive look-ups, an average time between successive modifications of the look-up table. The method enables the network element to be configured in a way that the hardware resources of the network element are utilized in an optimal or at least a suitable way.

13 Claims, 3 Drawing Sheets

(56) References Cited

U.S. PATENT DOCUMENTS

| | | | | |
|---|---|---|---|---|
| 2007/0028039 A1* | 2/2007 | Gupta | ............ | G11C 15/00 |
| | | | | 711/108 |
| 2009/0037601 A1* | 2/2009 | Jain | ............ | H04L 12/66 |
| | | | | 709/242 |
| 2009/0238179 A1 | 9/2009 | Samprathi | | |
| 2011/0122889 A1* | 5/2011 | Pacella | ............ | H04L 45/742 |
| | | | | 370/428 |
| 2011/0307656 A1* | 12/2011 | Hamdi | ............ | H04L 45/7453 |
| | | | | 711/108 |
| 2013/0051392 A1* | 2/2013 | Filsfils | ............ | H04L 45/025 |
| | | | | 370/392 |
| 2014/0086254 A1* | 3/2014 | Hardie | ............ | H04L 45/60 |
| | | | | 370/400 |
| 2014/0119189 A1 | 5/2014 | Lin | | |

FOREIGN PATENT DOCUMENTS

| | | |
|---|---|---|
| EP | 2309680 A1 | 4/2011 |
| GB | 2459433 A | 10/2009 |

OTHER PUBLICATIONS

Finnish Search Report, dated Oct. 9, 2013, from corresponding Finnish application.

* cited by examiner

METHOD AND A DEVICE FOR DEFINING IMPLEMENTATION OF A LOOK-UP TABLE FOR A NETWORK ELEMENT OF A SOFTWARE-DEFINED NETWORK

FIELD OF THE INVENTION

The invention relates generally to a software-defined network "SDN". More particularly, the invention relates to a method, a device, and a computer program for defining implementation of a look-up table for a network element of a software-defined network. Furthermore, the invention relates to a network element of a software-defined network.

BACKGROUND

Software-defined networking is an emerging architecture for data transfer networks. In a software-defined network "SDN", the control plane is separated from the data plane so that the control plane is implemented in one or more controllers that can be separate from the network elements and the data plane is implemented in the network elements. The network elements can be, for example, Internet Protocol "IP" routers, multiprotocol label switching "MPLS" nodes, packet optical switches, and/or Ethernet switches. Each network element may consist of a single apparatus or a combination of a plurality of apparatuses. Typically, the software-defined networking allows for quick experimenting and optimization of switching and/or routing policies and external access to the innards of network elements that formerly were closed and proprietary.

Internet Protocol "IP" based networks were initially built based on the concept of Autonomous Systems "AS". This concept allows networks to scale and extend by connected junctions that forward packets to a reasonable next hop based on partial need-to-know information. The AS principle works much like the traditional post office service, where a postal worker in a given city does not need to know all the tenants of all the streets in another city in order to choose a reasonable next hop for a letter at hand. This approach to networking is simple, and has proven resilient and scalable. This approach has, however, a few drawbacks. It does not allow the designated destinations, or tenants with home mail-boxes, to move without changing their identity as far as the packet delivery service is concerned. The topological location of destinations, which is the network interface they are attached to, dictates their identity related to the packet delivery service. In addition, using only the basic AS principle, it is hard to specify other qualities, such as logical grouping, access control, quality of service, intermediate network processing, or to specify aspects that relate to a sequence of packets that form a flow.

Using the analogy of the postal service, the software-defined networking works, for any given street location, so that all the letters from all the tenants would first be aggregated by a network element on an edge a software-defined network. This network element is configured to examine the current location for each of the letter-destinations using a global lookup mechanism. Based on that global lookup and on other globally defined and globally measured considerations, such as access control or remote location load conditions, the said network element places one or more of the original letters in an additional envelope addressed to each of the street locations where the destinations currently are. It then uses the normal postal service which works like the traditional Internet Protocol "IP" to get these outer envelopes to the remote locations. This is done based on the existing and scalable hop-by-hop forwarding services. The outer letters are then opened by a remote network element and the original envelopes are delivered to the destinations. It is to be noted that the above-presented analogy between the software-defined networking and the postal service is a strong simplification and it gives only a limited viewpoint about the versatile possibilities provided by the software-defined networking.

The software defined networking is, however, not free from challenges. Some of the challenges are related to configuring the network elements so that the network elements are constantly capable of carrying out the above-illustrated tasks and so that the resources of the network elements are utilized in a sufficiently optimal way. Configuring a network element comprises defining and implementing one or more look-up tables with the aid of which the network element is capable of operating as a part of a software-defined network. Each look-up table should be implemented so that the hardware resources of the network element are utilized in a sufficiently efficient way.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new method for defining implementation of a look-up table for a network element of a software-defined network, where the network element comprises hardware for implementing the look-up table in two or more mutually alternative ways. A method according to the invention comprises selecting an optimal, or at least a suitable, one of the two or more mutually alternative ways to implement the look-up table on the basis of the hardware available for implementing the look-up table, one or more first data items, and one or more second data items, where:
  the one or more first data items provide information about
    one or more look-up keys of the look-up table, and
  the one or more second data items indicate at least one of
    the following: the maximum number of entries of the look-up table, an average time between successive look-ups from the look-up table, an average time between successive modifications of the look-up table.

The above-described method for defining the implementation of the look-up table enables the network element to be configured in a way that the hardware resources of the network element are utilized in an optimal or at least a suitable way. The information about a look-up key may indicate, for example but not necessarily, a field length of the look-up key and/or a type of the look-up such as e.g. Virtual Local Access Network Identifier "VLAN-ID", MultiProtocol label Switching "MPLS" label value, Internet Protocol destination address "IP DA", Internet Protocol source address "IP DA", and Ethernet Media Access Control "MAC" address. The field length can be expressed e.g. in bits or bytes. For example, the selection of the implementation way can be such that short field lengths of look-up keys and a small average time between successive look-ups, i.e. a high look-up frequency, tend to promote implementations based on the content access memory "CAM" technology whereas long field lengths and a low look-up frequency tend to promote implementations based on a retrieval tree "trie"-algorithm and the random access memory "RAM" technology. For another example, in conjunction with implementations based on the content access memory technology, a high relative portion of "don't care" key matching bit positions of the look-up table can be defined to promote the ternary content access memory "TCAM" technology whereas a low relative portion of the "don't care" key matching bit positions can be defined to promote the binary content access memory technology. For another example, the selection of the implementation way can be such that certain types of one or more look-up keys tend to promote a specific implementation. For example, there may be dedicated hardware for e.g. VLAN-ID look-up keys.

In accordance with the invention, there is provided also a new device for defining implementation of a look-up table for a network element of a software-defined network, the network element comprising hardware for implementing the look-up table in two or more mutually alternative ways. A device according to the invention comprises a processing system adapted to:

receive one or more first data items providing information about one or more look-up keys of the look-up table, receive one or more second data items indicating at least one of the following: the maximum number of entries of the look-up table, an average time between successive look-ups from the look-up table, an average time between successive modifications of the look-up table, and select one of the two or more mutually alternative ways to implement the look-up table on the basis of the hardware available for implementing the look-up table, the one or more first data items, and the one or more second data items.

In accordance with the invention, there is provided also a new network element for a software-defined network. The network element can be, for example, an Internet Protocol "IP" router, a multiprotocol label switching "MPLS" switch, a packet optical switch, and/or an Ethernet switch. The network element may consist of a single apparatus or a combination of a plurality of apparatuses. Furthermore, the network element may have a modular structure so that it comprises one or more line-interface modules and one or more other modules such as a control module. A network element according to the invention comprises:

a data transfer interface for receiving data and for transmitting data, the received data specifying a look-up table to be implemented in the network element, hardware for implementing the look-up table in two or more mutually alternative ways, and a device according to the invention for defining the implementation of the look-up table.

In accordance with the invention, there is provided also a new software-defined network that comprises one or more network elements according to the invention and a controller system for configuring the one or more network elements. It is to be noted that the controller system or one or more parts of it can also act as one or more network elements that can be e.g. an Internet Protocol "IP" router, a multi-protocol label switching "MPLS" node, a packet optical switch, and/or an Ethernet switch.

In accordance with the invention, there is provided also a new computer program for defining implementation of a look-up table for a network element of a software-defined network, the network element comprising hardware for implementing the look-up table in two or more mutually alternative ways. A computer program according to the invention comprises computer executable instructions for controlling a programmable processing system to select one of the two or more mutually alternative ways to implement the look-up table on the basis of the hardware available for implementing the look-up table, one or more first data items, and one or more second data items, where:

the one or more first data items providing information about one or more look-up keys of the look-up table, and the one or more second data items indicate at least one of the following: the maximum number of entries of the look-up table, an average time between successive look-ups from the look-up table, an average time between successive modifications of the look-up table.

In accordance with the invention, there is provided also a new computer program product. The computer program product comprises a non-volatile computer readable medium, e.g. a compact disc "CD", encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in the accompanied depending claims are mutually freely combinable unless otherwise explicitly stated.

BRIEF DESCRIPTION OF THE FIGURES

The exemplifying and non-limiting embodiments of the invention and their advantages are explained in greater detail below with reference to the accompanying drawings, in which.

DESCRIPTION OF EXEMPLIFYING EMBODIMENTS

Figure 1:
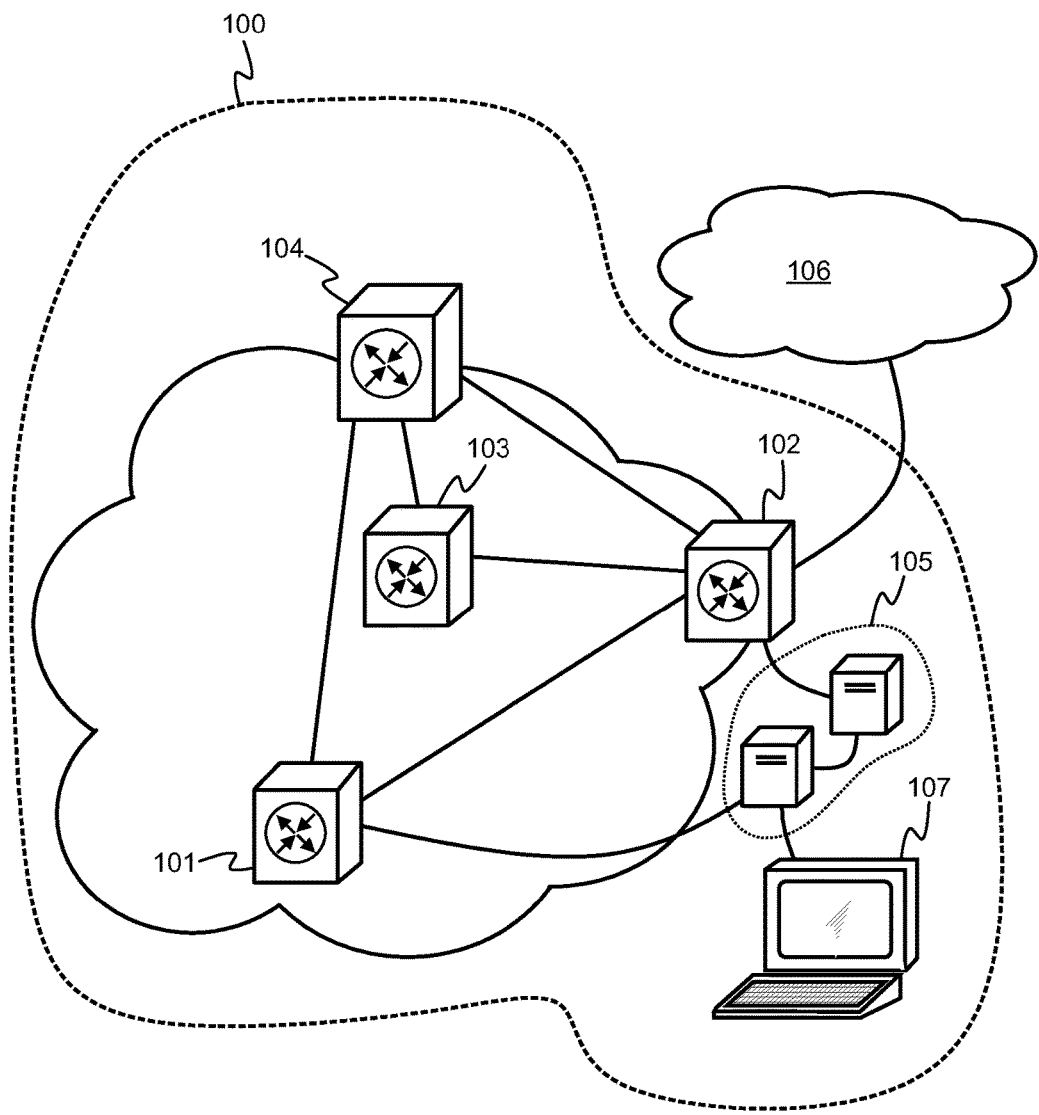
FIG. 1 shows a schematic illustration of a software-defined network according to an exemplifying embodiment of the invention.

FIG. 1 shows a schematic illustration of a software-defined network "SDN" 100 according to an exemplifying embodiment of the invention. The software-defined network comprises network elements 101, 102, 103, and 104 and a controller system 105. The network elements 101-104 of this exemplifying software-defined network are mutually interconnected with data transfer links as illustrated in FIG. 1. Furthermore, the exemplifying software-defined network "SDN" 100 may comprise other network elements that are not shown in FIG. 1. Each of the network elements may be e.g. an Internet Protocol "IP" router, a multiprotocol label switching "MPLS" node, a packet optical switch, and/or an Ethernet switch. Each network element may consist of a single apparatus or a combination of a plurality of apparatuses. As well, the controller system 105 may consist of a single apparatus or a combination of a plurality of apparatuses. In the exemplifying case illustrated in FIG. 1, the controller system 105 comprises two interconnected apparatuses. A terminal device 107 is connected to the controller system 105 and the network element 102 acts as a gateway to an external network 106 that can be e.g. the global Internet. The controller system 105 comprises a data transfer interface for receiving data from the terminal device 107 and/or from one or more other devices connected with data transfer links to the data transfer interface of the controller system. It is to be noted that the controller system 105 or one or more parts of it can also act as one or more network elements that can be e.g. an Internet Protocol "IP" router, a multiprotocol label switching "MPLS" node, a packet optical switch, and/or an Ethernet switch.

Each of the network elements 101-104 comprises a control processor section for maintaining a look-up system that comprises at least one look-up table defining actions to be executed in conjunction with managing data frames, and a data forwarding section for managing the data frames in accordance with the look-up system. The at least one look-up table of the look-up system may comprise, for example but not necessarily, one or more successive flow tables and a group table according to the OpenFlow specification. The OpenFlow is managed by the Open Networking Foundation "ONF". In the exemplifying case where the OpenFlow is used, each flow table in a network element contains a set of flow entries. Each flow entry may consist of match fields, counters, and a set of actions to apply to matching data frames. Matching typically starts at the first flow table and may continue to additional flow tables. Flow entries can be arranged into a priority order and the first matching entry in each table is the one being used. If a matching flow entry is found, the one or more actions associated with this specific flow entry are executed. If no match is found in a flow table, the data frame may be forwarded to the controller system 105 over an OpenFlow channel between the network element under consideration and the controller system 105, the data frame may be dropped, or the data frame may continue to the next flow table or to the group table. Actions associated with each flow entry may comprise for example data frame forwarding, data frame modification, group table processing, and pipeline processing. Pipeline processing actions allow data frames to be sent to subsequent flow tables for further processing and allow information, in the form of metadata, to be communicated between the flow tables. Table pipeline processing stops when the one or more actions associated with a matching flow entry does not specify a next table. At this point, the data frame under consideration is usually modified and forwarded. The group table processing actions allow data frames to be sent to the group table for further processing and allow information, in the form of metadata, to be communicated to the group table. The group table contains group entries, where each group entry may contain a list of actions to be directed data frames defined to belong to a particular group.

The controller system 105 is adapted to send, to each of the network elements 101-104, configuration data that comprises data items for configuring the network element under consideration to maintain the look-up system in accordance with, for example, a pre-determined collection of actions defined by a protocol, e.g. the OpenFlow, for configuring network elements. Furthermore, the configuration data may comprise one or more configuration programs each of which comprising one or more computer executable instructions defining an action or a chain of actions to be executed in conjunction with managing data frames in the network element under consideration. The control processor section of each of the network elements 101-104 can be adapted to associate each configuration program to the one or more look-up tables of the look-up system so that the configuration program is callable to be executed in conjunction with managing data frames with the aid of the look-up system. The data forwarding section of each of the network elements 101-104 can be adapted to execute the action or the chain of actions defined by the configuration program in response to a situation in which the managing a particular data frame includes an order to execute the configuration program. The action or the chain of actions defined by the configuration program may comprise for example: reading data from a data frame, modifying the data frame, selecting one or more of egress ports of the network element and forwarding the data frame and its possible duplicates to the selected one or more egress ports, selecting one of the look-up tables of the look-up system and executing a look-up from the selected look-up table, performing arithmetic operations, branching operations, performing logical operations, reading metadata associated with the data frame, writing metadata associated with the data frame, modifying metadata associated with the data frame, dropping the data frame, and/or duplicating the data frame.

At least one of the network elements 101-104 comprises hardware for implementing, in two or more mutually alternative ways, at least one look-up table belonging to a look-up system of that network element. The hardware may comprise, for example, the data forwarding section of the network element, one or more random access memories "RAM" of the network element, one or more binary content access memories "CAM" of the network element, one or more ternary content access memories "TCAM" of the network element, and/or one or more memory busses of the network element. The network element is adapted to select an optimal, or at least a suitable, one of the mutually alternative ways to implement the look-up table on the basis of a) the hardware available for implementing the look-up table, b) information about one or more look-up keys, e.g. a field length or field lengths of the one or more look-up keys, and c) at least one of the following: the maximum number of entries of the look-up table, an average time between successive lookups, an average time between successive modifications of the look-up table. The purpose of the above-presented selection is to utilize the hardware resources of the network element in an optimal or at least a suitable way. For example, a short field length or short field lengths of the one or more look-up keys and a small average time between successive look-ups, i.e. a high look-up frequency, tend to promote implementations based on the content access memory technology whereas long field lengths and a low look-up frequency tend to promote implementations based on a retrieval tree "trie"-algorithm and the random access memory "RAM" technology. In conjunction with implementations based on the content access memory technology, a high relative portion of "don't care" key matching bit positions of the look-up table tends to promote ternary content access memory "TCAM" technology whereas a low relative portion of the "don't care" key matching bit positions tends to promote binary content access memory technology.

The above-mentioned network element can be adapted to compute, for example, a weighted sum of the one or more field lengths of the one or more look-up keys and at least one of the following: the maximum number of the entries of the look-up table, the average time between successive look-ups, and/or the average time between successive modifications of the look-up table. The weights in the weighted sum are preferably non-negative. The network element can be adapted to compare the weighted sum to a first threshold so as to make a selection between an implementation based on the content access memory technology and an implementation based on a retrieval tree algorithm and the random access memory technology. Advantageously, the implementation based on the content access memory technology is selected when the weighted sum is below the first threshold and otherwise the implementation based on a retrieval tree algorithm and the random access memory technology is selected. Furthermore, the network element can be adapted to make a further selection between the binary content access memory technology and the ternary content access memory technology when the first selection has led to the implementation based on the content access memory technology. For example, the network element can be adapted to compare a second threshold to a ratio of the number of "don't care" key matching bit positions of the look-up table to the number of all key matching bit positions of the look-up table so as to make the selection between the binary content access memory technology and the ternary content access memory technology. Advantageously, the implementation based on the ternary content access memory technology is selected when the above-mentioned ratio is above the second threshold because each "don't care" key matching bit position would require two lines in a binary content access memory in order to cover both the allowable alternatives, i.e. both "1" and "0", of the "don't care" key matching bit position. On the other hand, the ternary content access memory is more expensive than the binary content access memory, and thus it can be more advantageous to use the binary content access memory if the relative number of "don't care" key matching bit positions is small compared to the number of all key matching bit positions. The number of the "don't care" key matching bit positions can be used also in selection between an implementation based on the ternary content access memory technology and an implementation based on a retrieval tree algorithm and the random access memory technology so that a high relative number of the "don't care" key matching bit positions tend to promote the ternary content access memory.

In a general case, the look-up system of the above-mentioned network element may comprise more than one look-up table. The network element can be adapted to define implementations of two or more look-up tables temporally successively. The network element can be adapted to determine, after defining the implementation of each look-up table that is not the last one to be implemented, hardware that remains free for implementing one or more look-up tables to be implemented subsequently. Furthermore, the network element can be adapted to select the implementation of each look-up table on the basis of a) the hardware available for implementing this look-up table, b) information about one or more look-up keys, e.g. a field length or field lengths of the one or more look-up keys, related to this look-up table, and c) at least one of the following: the maximum number of entries of this look-up table, an average time between successive look-ups from this look-up table, an average time between successive modifications of this look-up table. The implementations of the look-up tables of the look-up system can be defined in the above-described way for example so that the look-up tables are handled in a descending size order, i.e. the implementation of the largest look-up table is defined first. It is also possible to obtain mutually different alternative look-up system implementations using different defining orders for the look-up tables and to select the most advantageous one of the alternative look-up system implementations. When comparing different look-up system implementations to each other, a look-up system can be characterized, for example, with a resource consumption estimate indicating a load factor of at least one component of the network element under consideration when running operations related to the look-up system under consideration. The at least one component of the network element may comprise, for example, the data forwarding section of the network element, the control processor section of the network element, one or more random access memories "RAM" of the network element, one or more binary content access memories "CAM" of the network element, one or more ternary content access memories "TCAM" of the network element, and/or one or more memory busses of the network element.

Each look-up table of a look-up system implementation under consideration can be associated with a look-up table specific resource consumption estimate that may comprise, for example, one or more numerical values indicating load factors of one or more components of the network element when running the look-up table under consideration. For example, when running operations related to a first exemplifying look-up table implemented with content access memories, the load factor of the data forwarding section of the network element may be e.g. 50% of the processing capacity, the load factor of random access memories "RAM" of the network element is zero, the load factor of the content access memories of the network element may be e.g. 45% of the memory capacity, and the load factor of memory busses may be e.g. 45% of their transfer capacity. Correspondingly, when running operations related to a second exemplifying look-up table having an algorithmic implementation, the load factor of the data forwarding section of the network element may be e.g. 46%, the load factor of random access memories "RAM" of the network element may be e.g. 38%, the load factor of the content access memories of the network element is zero, and the load factor of memory busses may be e.g. 25%. Thus, the look-up table specific resource consumption estimates for the first and second exemplifying look-up tables are the following vectors: [50%, 0, 45%, 45%] and [46%, 38%, 0, 25%], respectively. In this exemplifying case, the resource consumption estimate of a look-up system implementation consisting of the above-mentioned first and second exemplifying look-up tables would be [96%, 38%, 45%, 70%]. If any of these numerical values exceeded 100%, the network element under consideration would not be capable of running the look-up system implementation under consideration. In this case, a different look-up system implementation should be defined for the network element. A criterion for selecting one of the different look-up system implementations can be, for example, such that a greatest one of the numerical values constituting the resource consumption estimate of a look-up system implementation should be as small as possible in order to avoid adverse bottle-necks in the operation of the network element.

The network element under consideration can be adapted to send the resource consumption estimate of the look-up system implementation to the controller system 105 in order to enable the controller system 105 to optimize the software-defined network 100 as a whole. For example, the controller system 105 can be adapted to configure a routing topology of the software-defined network 100 so that more data traffic load is allocated to a network element under consideration when the resource consumption estimate of the look-up system implementation of the network element manifests lower loading of the network element than when the resource consumption estimate of the look-up system implementation manifests higher loading of the network element. The network element may have a modular structure so that it comprises one or more line-interface modules, such as ingress and egress modules, and one or more other modules such as a control module and/or a powering module. In this case, there can be more than one resource consumption estimate per a network element and each resource consumption estimate can be provided by a module indicator which expresses the module whose loading is indicated by the resource consumption estimate. The module indicator may express the individual module or only a type of the module such as: an ingress module, an egress module, or a module related to control of the network element as whole. The module indicators can be utilized when optimizing the routing topology of the software-defined network 100 for example in a situation where e.g. one or more line-interface modules are at a risk of being overloaded whereas other parts of the network element have still margin in their resource consumptions.

Figure 2:
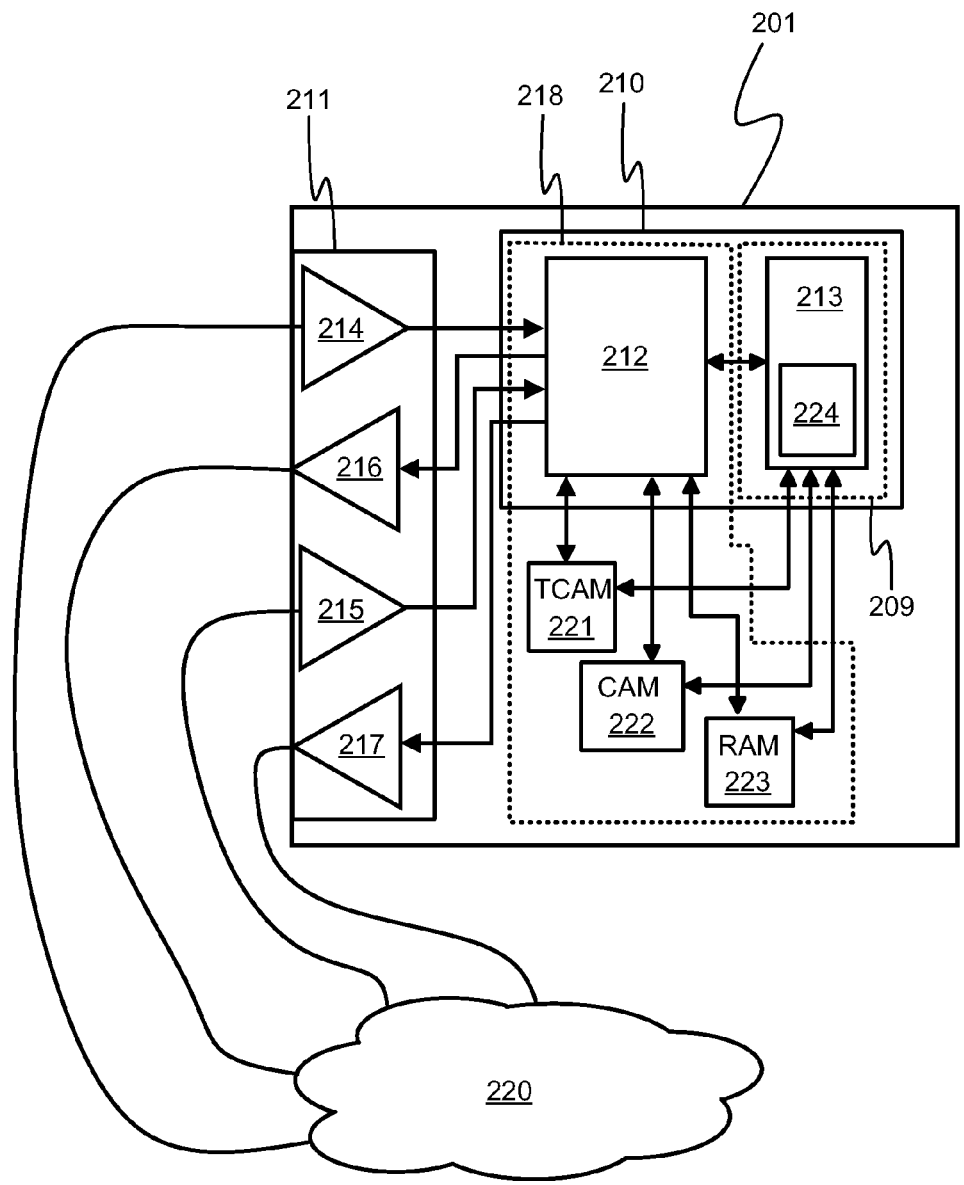
FIG. 2 shows a schematic illustration of a network element according to an exemplifying embodiment of the invention.

FIG. 2 shows a schematic illustration of a network element 201 according to an exemplifying embodiment of the invention. The network element can be, for example, an Internet Protocol "IP" router, a Multiprotocol label switching "MPLS" switch, a packet optical switch, and/or an Ethernet switch. In this exemplifying case, the network element is a single apparatus but, as mentioned earlier in this document, the network element could as well be a combination of a plurality of apparatuses. The network element comprises a data transfer interface 211 for receiving data and for transmitting data. The data transfer interface 211 comprises ingress ports 214 and 215 and egress ports 216 and 217 for connecting via data transfer links to a data transfer network 220. The network element 201 comprises a processing system 210 that comprises a control processor section 213 and a data forwarding section 212. The network element comprises hardware 218 for implementing a look-up table in two or more mutually alternative ways, where the look-up table is specified by data received at the network element. In this exemplifying case, the hardware 218 comprises the data forwarding section 212, a ternary content access memory "TCAM" 221, a binary content access memory "CAM" 222, and a random access memory "RAM" 223. The network element comprises a device 209 for defining the implementation of the look-up table. The device comprises means for selecting an optimal, or at least a suitable, one of the mutually alternative ways to implement the look-up table on the basis of a) the hardware available for implementing the look-up table, b) information about one or more look-up keys, e.g. a field length or field lengths of the one or more look-up keys, and c) at least one of the following: the maximum number of entries of the look-up table, an average time between successive look-ups, an average time between successive modifications of the look-up table. In the exemplifying case illustrated in FIG. 2, the above-mentioned means are implemented with a processing system 224 that represents the control processor section 213 or a part of the control processor section. The control processor section 213 is adapted to configure the hardware 218 to implement the look-up table, and the data forwarding section 312 is adapted to manage the data frames in accordance with the look-up table.

In a network element according to an exemplifying embodiment of the invention, the processing system 224 of the device 209 is adapted to compute a weighted sum of the one or more field lengths of the one or more look-up keys and at least one of the following: the maximum number of entries of the look-up table, the average time between successive look-ups, the average time between successive modifications of the look-up table. The processing system 224 is adapted to compare the weighted sum to a first threshold so as to make a selection between an implementation based on the content access memory technology and an implementation based on a retrieval tree algorithm and the random access memory technology.

In a network element according to an exemplifying embodiment of the invention, the processing system 224 of the device 209 is adapted to compare a second threshold to a data item indicating a ratio of the number of "don't care" key matching bit positions of the look-up table to the number of all key matching bit positions of the look-up table so as to make a selection between an implementation based on the binary content access memory technology and an implementation based on the ternary content access memory technology.

In a network element according to an exemplifying embodiment of the invention, the processing system 224 of the device 209 is adapted to determine hardware that remains free for implementing another look-up table after implementation of the earlier-mentioned look-up table and to select one of the two or more mutually alternative ways to implement the other look-up table on the basis of a) the hardware available for implementing the other look-up table, b) information about one or more look-up keys, e.g. a field length or field lengths of the one or more look-up keys, related to the other look-up table, and c) at least one of the following: the maximum number of entries of the other look-up table, an average time between successive look-ups from the other look-up table, an average time between successive modifications of the other look-up table.

The processing system 210 of the network element shown in FIG. 2 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

Figure 3:
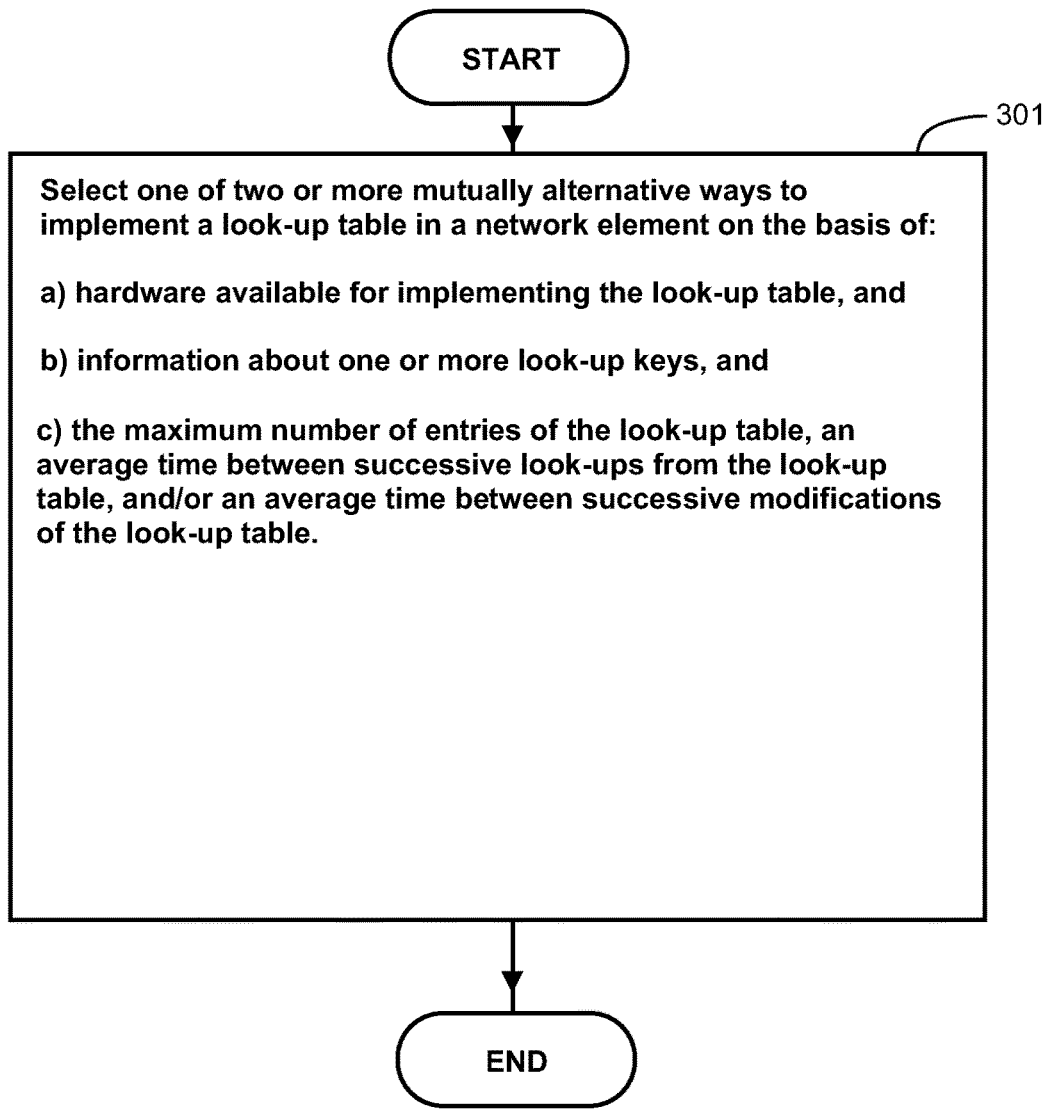
FIG. 3 shows a flow chart of a method according to an exemplifying embodiment of the invention for configuring a network element of a software-defined network.

FIG. 3 shows a flow chart of a method according to an exemplifying embodiment of the invention for defining implementation of a look-up system for a network element of a software-defined network, where the network element comprises hardware for implementing the look-up table in two or more mutually alternative ways. The method comprises, action 301, selecting an optimal, or at least a suitable, one of the two or more mutually alternative ways to implement the look-up table on the basis of the hardware available for implementing the look-up table, one or more first data items, and one or more second data items, where:

the one or more first data items provides information about one or more look-up keys of the look-up table, and the one or more second data items indicate at least one of the following: the maximum number of entries of the look-up table, an average time between successive look-ups from the look-up table, an average time between successive modifications of the look-up table.

A method according to an exemplifying embodiment of the invention comprises computing a weighted sum of the one or more first data items and the one or more second data items and comparing the weighted sum to a first threshold so as to make a selection between an implementation based on the content access memory technology and an implementation based on a retrieval tree algorithm and the random access memory technology.

A method according to an exemplifying embodiment of the invention comprises comparing a second threshold to a third data item indicating a ratio of the number of "don't care" key matching bit positions of the look-up table to the number of all key matching bit positions of the look-up table so as to make a selection between an implementation based on the binary content access memory technology and an implementation based on the ternary content access memory technology.

A method according to an exemplifying embodiment of the invention comprises determining hardware remaining free for implementing another look-up table after implementation of the earlier-mentioned look-up table and selecting one of the two or more mutually alternative ways to implement the other look-up table on the basis of the hardware available for implementing the other look-up table and data related to the other look-up table and indicating corresponding information as the one or more first data items and the one or more second data items indicate relating to the earlier-mentioned look-up table.

A computer program according to an exemplifying embodiment of the invention for defining implementation of a look-up table comprises computer executable instructions for controlling a programmable processing system to carry out a method according to any of the above-described exemplifying embodiments of the invention.

A computer program according to an exemplifying embodiment of the invention comprises software modules for defining implementation of a look-up system for a network element of a software-defined network, where the network element comprises hardware for implementing the look-up table in two or more mutually alternative ways. The software modules comprise computer executable instructions for controlling a programmable processing system to select one of the two or more mutually alternative ways to implement the look-up table on the basis of the hardware available for implementing the look-up table, one or more first data items, and one or more second data items, where:
 the one or more first data items provides information about one or more look-up keys of the look-up table, each field length being expressible in bits, and
 the one or more second data items indicate at least one of the following: the maximum number of entries of the look-up table, an average time between successive look-ups from the look-up table, an average time between successive modifications of the look-up table.

The software modules can be e.g. subroutines or functions implemented with a suitable programming language and with a compiler suitable for the programming language and the programmable processing system.

A computer program product according to an exemplifying embodiment of the invention comprises a computer readable medium, e.g. a compact disc ("CD"), encoded with a computer program according to an exemplifying embodiment of invention.

A signal according to an exemplifying embodiment of the invention is encoded to carry information defining a computer program according to an exemplifying embodiment of invention.

The specific examples provided in the description given above should not be construed as limiting the scope and/or the applicability of the appended claims.

What is claimed is:

1. A device for defining implementation of a first look-up table and a second look-up table for a network element of a software-defined network, the network element comprising hardware for implementing each of the first look-up table and the second look-up table in two or more mutually alternative ways, the device comprising a processing system configured to:
 receive one or more first data items providing information about one or more look-up keys of the first look-up table,
 receive one or more second data items indicating at least one of the following: the maximum number of entries of the first look- up table, an average time between successive look-ups from the first look-up table, an average time between successive modifications of the first look-up table,
 select one of the two or more mutually alternative ways to implement the first look-up table on the basis of the hardware available for implementing the first look-up table, the one or more first data items, and the one or more second data items, and
 determine the hardware remaining free for implementing the second look-up table after implementation of the first look-up table and to select one of the two or more mutually alternative ways to implement the second look-up table to exist simultaneously with the first look-up table on the basis of the hardware available for implementing the second look-up table and data related to the second look-up table and indicating corresponding information as the one or more first data items and the one or more second data items indicate relating to the first look-up table; and
 wherein one or more actions associated with a matching entry of the first look-up table in conjunction with managing a data frame specifying the second look-up table to be used in conjunction with the managing the data frame.

2. A device according to claim 1, wherein the processing system is configured to compute a weighted sum of the one or more first data items and the one or more second data items and to compare the weighted sum to a first threshold so as to make a selection between an implementation based on content access memory technology and an implementation based on a retrieval tree algorithm and random access memory technology.

3. A device according to claim 2, wherein the processing system is configured to compare a second threshold to a third data item indicating a ratio of the number of don't care key matching bit positions of the first look-up table to the number of all key matching bit positions of the first look-up table so as to make a selection between an implementation based on binary content access memory technology and an implementation based on ternary content access memory technology.

4. A device according to claim 1, wherein the processing system is configured to compare a second threshold to a third data item indicating a ratio of the number of don't care key matching bit positions of the first look-up table to the number of all key matching bit positions of the first look-up table so as to make a selection between an implementation based on binary content access memory technology and an implementation based on ternary content access memory technology.

5. A network element for a software-defined network, the network element comprising: a data transfer interface for receiving data and for transmitting data, the received data specifying a first look-up table and a second look-up table to be implemented in the network element, hardware for implementing each of the first look-up table and the second look-up table in two or more mutually alternative ways, and
   a device for defining implementation of the first look-up table and the second look-up table, the device comprising a processing system configured to:
   receive one or more first data items providing information about one or more look-up keys of the first look-up table,
   receive one or more second data items indicating at least one of the following: the maximum number of entries of the first look-up table, an average time between successive look-ups from the first look-up table, an average time between successive modifications of the first look-up table,
   select one of the two or more mutually alternative ways to implement the first look-up table on the basis of the hardware available for implementing the first look-up table, the one or more first data items, and the one or more second data items, and
   determine the hardware remaining free for implementing the second look-up table after implementation of the first look-up table and to select one of the two or more mutually alternative ways to implement the second look-up table to exist simultaneously with the first look-up table on the basis of the hardware available for implementing the second look-up table and data related to the second look-up table and indicating corresponding information as the one or more first data items and the one or more second data items indicate relating to the first look-up table; and
   wherein one or more actions associated with a matching entry of the first look-up table in conjunction with managing a data frame specifying the second look-up table to be used in conjunction with the managing the data frame.

6. A network element according to claim 5, wherein the network element is at least one of the following: an Internet Protocol router, a multiprotocol label switching switch, a packet optical switch, an Ethernet switch.

7. A method for implementing a first look-up table and a second look-up table for a network element of a software-defined network, the network element comprising hardware for implementing each of the first look-up table and the second look-up table in two or more mutually alternative ways, the method comprising:
   selecting one of the two or more mutually alternative ways to implement the first look-up table on the basis of the hardware available for implementing the first look-up table, one or more first data items, and one or more second data items, wherein
   the one or more first data items provide information about one or more look-up keys of the first look-up table, and
   the one or more second data items indicate at least one of the following: the maximum number of entries of the first look-up table, an average time between successive look-ups from the first look-up table, an average time between successive modifications of the first look-up table, and
   the method further comprising determining the hardware remaining free for implementing the second look-up table after implementation of the first look-up table and selecting one of the two or more mutually alternative ways to implement the second look-up table to exist simultaneously with the first look-up table on the basis of the hardware available for implementing the second look-up table and data related to the second look-up table and indicating corresponding information as the one or more first data items and the one or more second data items indicate relating to the first look-up table; and
   wherein one or more actions associated with a matching entry of the first look-up table in conjunction with managing a data frame specifying the second look-up table to be used in conjunction with the managing the data frame.

8. A method according to claim 7, wherein the method comprises computing a weighted sum of the one or more first data items and the one or more second data items and comparing the weighted sum to a first threshold so as to make a selection between an implementation based on content access memory technology and an implementation based on a retrieval tree algorithm and random access memory technology.

9. A method according to claim 8, wherein the method comprises comparing a second threshold to a third data item indicating a ratio of the number of don't care key matching bit positions of the first look-up table to the number of all key matching bit positions of the first look-up table so as to make a selection between an implementation based on binary content access memory technology and an implementation based on ternary content access memory technology.

10. A method according to claim 7, wherein the method comprises comparing a second threshold to a third data item indicating a ratio of the number of don't care key matching bit positions of the first look-up table to the number of all key matching bit positions of the first look-up table so as to make a selection between an implementation based on binary content access memory technology and an implementation based on ternary content access memory technology.

11. A non-transitory computer readable medium encoded with a computer program for implementing a first look-up table and a second look-up table for a network element of a software-defined network, the network element comprising hardware for implementing each of the first look-up table and the second look-up table in two or more mutually alternative ways, the computer program comprising computer executable instructions for controlling a programmable processing system to perform a method comprising:
   selecting one of the two or more mutually alternative ways to implement the first look-up table on the basis of the hardware available for implementing the first look-up table, one or more first data items, and one or more second data items,
   wherein
   the one or more first data items provide information about one or more look-up keys of the first look-up table, and
   the one or more second data items indicate at least one of the following: the maximum number of entries of the first look-up table, an average time between successive look-ups from the first look-up table, an average time between successive modifications of the first look-up table,
   wherein the computer program further comprises computer executable instructions for controlling the programmable processing system to determine the hardware remaining free for implementing the second look-up table after implementation of the first look-up table and select one of the two or more mutually alternative ways to implement the second look-up table to exist simultaneously with the first look-up table on the basis of the hardware available for implementing the second look-up table and data related to the second look-up table and indicating corresponding information as the one or more first data items and the one or more second data items indicate relating to the first look-up table; and wherein one or more actions associated with a matching entry of the first look-up table in conjunction with managing a data frame specifying the second look-up table to be used in conjunction with the managing the data frame.

12. A software-defined network comprising:
a controller system for transmitting configuration data to the one or more network elements so as to configure the one or more network elements, the configuration data specifying a first look-up table and a second look-up table to be implemented in the one or more network elements, and one or more network elements, wherein each of the network elements comprises:

a data transfer interface for receiving data and for transmitting data, the received data specifying the first look-up table and the second look-up table to be implemented in the network element, hardware for implementing each of the first look-up table and the second look-up table in two or more mutually alternative ways, and a device for defining implementation of the first look-up table and the second look-up table, the device comprising a processing system configured to:

receive one or more first data items providing information about one or more look-up keys of the first look-up table, receive one or more second data items indicating at least one of the following: the maximum number of entries of the first look-up table, an average time between successive look-ups from the first look-up table, an average time between successive modifications of the first look-up table, select one of the two or more mutually alternative ways to implement the first look-up table on the basis of the hardware available for implementing the first look-up table, the one or more first data items, and the one or more second data items, and determine the hardware remaining free for implementing the second look-up table after implementation of the first look-up table and to select one of the two or more mutually alternative ways to implement the second look-up table to exist simultaneously with the first look-up table on the basis of the hardware available for implementing the second look-up table and data related to the second look-up table and indicating corresponding information as the one or more first data items and the one or more second data items indicate relating to the first look-up table; and wherein one or more actions associated with a matching entry of the first look-up table in conjunction with managing a data frame specifying the second look-up table to be used in conjunction with the managing the data frame.

13. A software-defined network according to claim 12, wherein the controller system is configured to use the OpenFlow as a communication method for a control plane of the software-defined network to communicate with a data plane of the software-defined network.

* * * * *